United States Patent
Lapierre et al.

(10) Patent No.: US 10,260,122 B2
(45) Date of Patent: Apr. 16, 2019

(54) PLASTIC INJECTION MOLD TOOLING AND A METHOD OF MANUFACTURE THEREOF

(71) Applicant: A. Finkl & Sons Co., Chicago, IL (US)

(72) Inventors: Louis-Philippe Lapierre, Chicago, IL (US); Algirdas Underys, Arlington Heights, IL (US)

(73) Assignee: A. FINKL & SONS CO., Chicago, IL (US)

( * ) Notice: Subject to any disclaimer, the term of this patent is extended or adjusted under 35 U.S.C. 154(b) by 0 days.

(21) Appl. No.: 16/018,833

(22) Filed: Jun. 26, 2018

(65) Prior Publication Data

US 2018/0298458 A1    Oct. 18, 2018

Related U.S. Application Data

(63) Continuation-in-part of application No. 14/998,701, filed on Feb. 5, 2016.

(51) Int. Cl.

| | | |
|---|---|---|
| *C21D 9/00* | (2006.01) | |
| *C22C 38/44* | (2006.01) | |
| *C22C 38/06* | (2006.01) | |
| *C22C 38/04* | (2006.01) | |
| *C22C 38/02* | (2006.01) | |
| *C22C 38/00* | (2006.01) | |
| *C22C 33/04* | (2006.01) | |
| *C21D 8/00* | (2006.01) | |
| *C21D 6/00* | (2006.01) | |
| *B22D 27/00* | (2006.01) | |
| *B22D 27/15* | (2006.01) | |
| *B29C 33/38* | (2006.01) | |
| *C22C 38/46* | (2006.01) | |
| *B29C 45/26* | (2006.01) | |

(52) U.S. Cl.
CPC ......... *C21D 9/0068* (2013.01); *B22D 27/003* (2013.01); *B22D 27/15* (2013.01); *B29C 33/3842* (2013.01); *C21D 6/004* (2013.01); *C21D 6/005* (2013.01); *C21D 6/008* (2013.01); *C21D 8/005* (2013.01); *C22C 33/04* (2013.01); *C22C 38/002* (2013.01); *C22C 38/02* (2013.01); *C22C 38/04* (2013.01); *C22C 38/06* (2013.01); *C22C 38/44* (2013.01); *C22C 38/46* (2013.01); *B29C 45/26* (2013.01); *B29K 2905/12* (2013.01); *B29K 2995/007* (2013.01)

(58) Field of Classification Search
CPC ...... C21D 9/0068; C21D 8/005; C21D 6/008; C22C 38/44; C22C 38/06; C22C 38/04; C22C 38/02; B22D 27/003; B22D 27/15; B29C 33/3842

See application file for complete search history.

(56) References Cited

U.S. PATENT DOCUMENTS

2017/0226605 A1    8/2017    Lapierre-Boir

FOREIGN PATENT DOCUMENTS

KR    100960088 B1    5/2010

OTHER PUBLICATIONS

International Search Report related to Application No. EP 17165518.6 dated Oct. 9, 2017.
Satyendra "Vacuum Deagassing Processes for Liquid Steel", (Jul. 12, 2016), pp. 1-13, XP002773910, Retrieved from the Internet: URL:http://ispatgurti.com/vacuum-degassing-processes-for-liquid-steel/ [retrieved on Sep. 18, 2017] p. 1, paragraph 3; p. 6.
"Casting Processes" in: James G. Braila: "Handbook of Manufacturing Processes", 2007, Industrial Press, Inc., New York, XP002773911, pp. FP-33, p. 4, col. 2, paragraph 3; p. 6.

*Primary Examiner* — Jessee R Roe
(74) *Attorney, Agent, or Firm* — Miller, Matthias & Hull LLP

(57) ABSTRACT

This invention pertains to plastic injection mold tooling, and also large forgings, formed from a low carbon mold steel having markedly increased hardening and hardenability properties in large sections as contrasted to currently available commercial products. The above attributes are obtained together with equal or better machinability and improved mold parting line wear. When manufactured in conjunction with a double melt process, this invention can improve significantly polishing characteristics and other attributes of molded parts in tooling sets.

11 Claims, 1 Drawing Sheet

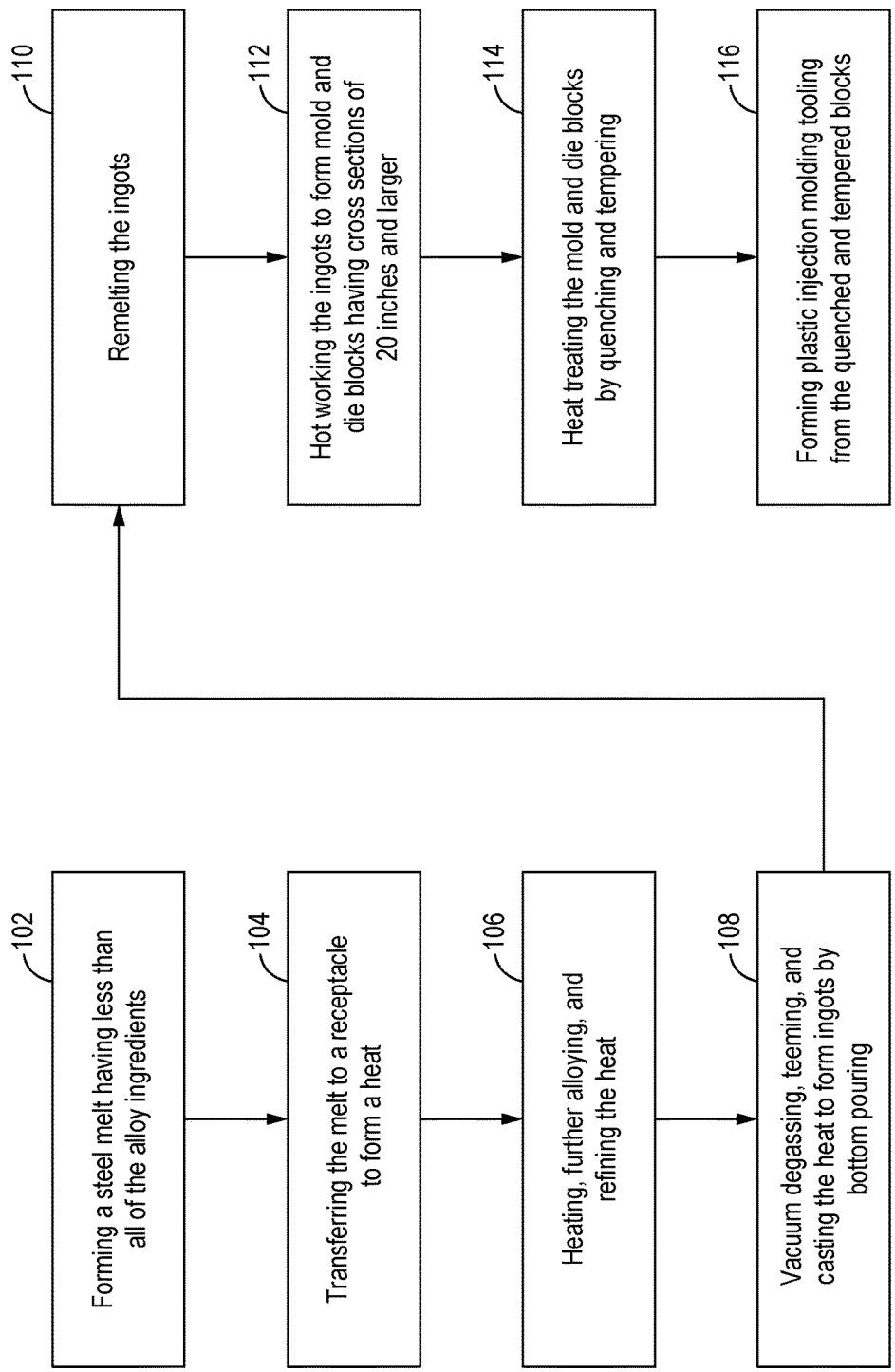

PLASTIC INJECTION MOLD TOOLING AND A METHOD OF MANUFACTURE THEREOF

CROSS-REFERENCE TO RELATED APPLICATION

This application is a continuation-in-part pursuant to 35 U.S.C. § 120 of U.S. patent application Ser. No. 14/998,701 filed on Feb. 5, 2016.

FIELD OF THE DISCLOSURE

This invention pertains to plastic injection mold tooling, and also large forgings, formed from a low carbon mold steel having markedly increased hardening and hardenability properties in large sections as contrasted to currently available commercial products. The above attributes are obtained together with equal or better machinability and improved mold parting line wear. When manufactured in conjunction with a double melt process, this invention can improve significantly polishing characteristics and other attributes of molded parts in tooling sets.

BACKGROUND OF THE DISCLOSURE

The place of plastics in the automotive industry has grown tremendously as it is a key to future high performance, more fuel efficient vehicles. Plastics offer designers and engineers multiple advantages in many applications by providing lightweight and versatile designs as well as lower manufacturing costs. The versatility of plastics can be expressed by the wide range of shapes and surface finishes now possible. However, this versatility would not be possible without quality plastic injection mold steels. The increasing demand for fuel efficient cars is pushing designers to create more aerodynamic cars, which in turn require larger complex plastic parts such as bumpers, dashboards and door panels. Other industries have similar requirements for plastic parts such as exterior furniture. Plastic injection molding is used for a fast paced production and tool steels are used for this application. The properties of a quality plastic injection mold steel vary from the mold manufacturer to the end-user. Good machinability as well as the ability to provide a good surface finish are important aspects for the mold manufacturer. However, uniform hardness is the key for the end-user to produce parts without shape distortion. As parts increase in size, molds have to be larger and still display these properties across the entire section.

SUMMARY OF THE DISCLOSURE

In accordance with one aspect of the present disclosure, a method of manufacturing plastic injection molding tooling having excellent hardenability in sections of 20 inches and larger is disclosed. The method may comprise the steps of: (1) forming a steel melt having less than all of the alloy ingredients in a heating unit; (2) transferring said melt to a receptacle to thereby form a heat; (3) heating, further alloying of the alloy composition into specification and refining said heat by stirring using argon purging, magnetic stirring or some other mixing method; (4) vacuum degassing, teeming and casting said heat to form ingots by bottom pouring; (5) remelting said ingots; and (6) hot working said ingots to form mold and die blocks having cross sections of 20 inches and larger. The mold and die blocks may have the following composition by weight percent:

| | |
|---|---|
| C | 0.15-0.40, |
| Mn | 0.60-1.10, |
| Si | 0.60 max, |
| Cr | 1.00-2.00, |
| Ni | 0.15-1.00, |
| Mo | 0.20-0.55, |
| V | 0.05-0.20, |
| Al | 0.040 max, |
| P | 0.025 max, and |
| S | 0.025 max. |

The method may further comprise the steps of: (7) heat treating said mold and die blocks by quenching and tempering, and (8) forming plastic injection molding tooling from said quenched and tempered blocks.

In another refinement, remelting said ingots may comprise remelting said ingots by vacuum arc remelting (VAR).

In another refinement, remelting said ingots may comprise remelting said ingots by electroslag remelting (ESR).

In another refinement, said heating unit is an electric arc furnace.

In another refinement, said heating unit is a vacuum induction furnace.

In another refinement, the mold and die blocks have the following composition by weight percent:

| | |
|---|---|
| C | 0.20-0.35, |
| Mn | 0.70-1.10, |
| Si | 0.15-0.50, |
| Cr | 1.10-2.00, |
| Ni | 0.20-0.90, |
| Mo | 0.30-0.55, |
| V | 0.07-0.20, |
| Al | 0.040 max, |
| P | 0.020 max, and |
| S | 0.015 max. |

In another refinement, the mold and die blocks have the following composition by weight percent:

| | |
|---|---|
| C | 0.25-0.33, |
| Mn | 0.80-1.10, |
| Si | 0.20-0.45, |
| Cr | 1.20-2.00, |
| Ni | 0.30-0.80, |
| Mo | 0.35-0.55, |
| V | 0.10-0.20, |
| Al | 0.020 max, |
| P | 0.015 max, and |
| S | 0.005 max. |

In accordance with another aspect of the present disclosure, a plastic injection molding tooling having uniform hardenability in sections of 20 inches and larger is disclosed. The plastic injection mold tooling may be manufactured by a method comprising: (1) forming a steel melt having less than all of the alloy ingredients; (2) transferring said melt to a receptacle to thereby form a heat; (3) heating, further alloying of the alloy composition into specification and refining said heat by stirring using argon purging, magnetic stirring or some other mixing method; (4) vacuum degassing, teeming and casting said heat to form ingots by bottom pouring; (5) remelting said ingots; and (6) hot working said ingots to form mold and die blocks having cross sections of 20 inches and larger. The mold and die blocks may have the following composition by weight percent:

| | |
|---|---|
| C | 0.15-0.40, |
| Mn | 0.60-1.10, |
| Si | 0.60 max, |
| Cr | 1.00-2.00, |
| Ni | 0.15-1.00, |
| Mo | 0.20-0.55, |
| V | 0.05-0.20, |
| Al | 0.040 max, |
| P | 0.025 max, and |
| S | 0.025 max. |

The method may further comprise the steps of: (7) heat treating said mold and die blocks by quenching and tempering; and (8) forming plastic injection molding tooling from said quenched and tempered blocks.

In another refinement, remelting said ingots comprises remelting said ingots by vacuum arc remelting (VAR).

In another refinement, remelting said ingots comprises remelting said ingots by electroslag remelting (ESR).

In another refinement, forming said steel melt comprises forming said steel melt by electric arc melting.

In another refinement, forming said steel melt comprises forming said steel melt by vacuum induction melting.

In another refinement, said mold and die blocks have the following composition by weight percent:

| | |
|---|---|
| C | 0.20-0.35, |
| Mn | 0.70-1.10, |
| Si | 0.15-0.50, |
| Cr | 1.10-2.00, |
| Ni | 0.20-0.90, |
| Mo | 0.30-0.55, |
| V | 0.07-0.20, |
| Al | 0.040 max, |
| P | 0.020 max, and |
| S | 0.015 max. |

In another refinement, said mold and die blocks have the following composition by weight percent:

| | |
|---|---|
| C | 0.25-0.33, |
| Mn | 0.80-1.10, |
| Si | 0.20-0.45, |
| Cr | 1.20-2.00, |
| Ni | 0.30-0.80, |
| Mo | 0.35-0.55, |
| V | 0.10-0.20, |
| Al | 0.020 max, |
| P | 0.015 max, and |
| S | 0.005 max. |

In accordance with another aspect of the present disclosure, a method of manufacturing plastic injection molding tooling having excellent hardenability is section of 20 inches and larger is disclosed. The method may comprise the steps of: (1) forming a steel melt having less than all of the alloy ingredients in a heating unit; (2) transferring said melt to a receptacle to thereby form a heat; (3) heating, further alloying of the alloy composition into specification and refining said heat by stirring using argon purging, magnetic stirring or some other mixing method; (4) vacuum degassing, teeming and casting said heat to form ingots by bottom pouring; (5) remelting said ingots; and (6) hot working said ingots to form mold and die blocks having cross sections of 20 inches and larger. The mold and die blocks may comprise 0.05 to 0.20 percent by weight vanadium. The method may further comprise the steps of: (7) heat treating said mold and die blocks by quenching and tempering; and (8) forming plastic injection molding tooling from said quenched and tempered blocks.

In another refinement, remelting said ingots may comprise remelting said ingots by one of vacuum arc remelting (VAR) and electroslag remelting (ESR).

In another refinement, said mold and die blocks may further comprise the following elements in percent by weight:

| | |
|---|---|
| C | 0.15-0.40, |
| Mn | 0.60-1.10, |
| Si | 0.60 max, |
| Cr | 1.00-2.00, |
| Ni | 0.15-1.00, |
| Mo | 0.20-0.55, |
| Al | 0.040 max, |
| P | 0.025 max, and |
| S | 0.025 max. |

In another refinement, said mold and die blocks may have the following composition in percent by weight:

| | |
|---|---|
| C | 0.20-0.35, |
| Mn | 0.70-1.10, |
| Si | 0.15-0.50, |
| Cr | 1.10-2.00, |
| Ni | 0.20-0.90, |
| Mo | 0.30-0.55, |
| V | 0.07-0.20, |
| Al | 0.040 max, |
| P | 0.020 max, and |
| S | 0.015 max. |

In another refinement, said mold and die blocks may have the following composition in percent by weight:

| | |
|---|---|
| C | 0.25-0.33, |
| Mn | 0.80-1.10, |
| Si | 0.20-0.45, |
| Cr | 1.20-2.00, |
| Ni | 0.30-0.80, |
| Mo | 0.35-0.55, |
| V | 0.10-0.20, |
| Al | 0.020 max, |
| P | 0.015 max, and |
| S | 0.005 max. |

In another refinement, said heating unit is an electric arc furnace.

Other objects and advantages will be apparent from the following description.

BRIEF DESCRIPTION OF THE DRAWINGS

FIG. 1 is a flowchart of a series of steps that may be involved in manufacturing plastic injection mold tooling, in accordance with a method of the present disclosure.

DETAILED DESCRIPTION OF THE DISCLOSURE

Carbon is necessary to provide the required hardness and wear resistance. If carbon is significantly higher than 0.40% the mold block will exhibit low machinability and polishing characteristics. Preferably a maximum of 0.35% carbon is used to ensure good machinability. If substantially less than 0.15% carbon is used, wear resistance and mechanical properties will not be suitable for service conditions to which the mold blocks are subjected. Preferably, a minimum of 0.20% carbon is used to ensure acceptable wear resistance, hardness and mechanical properties. Most preferably, carbon in the range of 0.25% and 0.035% with an aim of 0.30% is used.

Manganese is essential for hardenability and as a deoxidizer in the steelmaking process. It also acts to control sulphides in forging operations in combination with the other alloying elements. If significantly higher than 1.10% is present there is a risk that retained austenite will be present. If substantially less than 0.60% manganese is present the hardenability of the mold block will be lessened. In addition, to ensure sulphur control the manganese content should be present in an amount of at least 20 times the sulphur content. Manganese also contributes to wear resistance, although to a lesser extent than other carbide formers. Preferably, manganese is present in the range of 0.70% to 1.10% and most preferably from 0.80% to 1.10%.

Silicon is specified for its deoxidizing ability in the steelmaking process. If present in substantially greater quantities than 0.60% there is a predisposition toward embrittlement of the final product.

Chromium is necessary for carbide formation, for hardenability and for wear resistance. If substantially more than the maximum of 2.00% chromium is present the hardening temperature becomes too high for normal production heat treatment processes. Below the specified minimum of 1.00% the wear resistance will be negatively affected. Preferably, chromium is present in the amount of 1.10% to 2.00% and most preferably from 1.20% to 2.00%.

Nickel is required to strengthen the ferrite and provide toughness to the mold block. If present in a quantity substantially more than 1.00% there is a risk of retained austenite and decrease in machinability. Excess nickel may also promote high temperature hairline cracking which requires scarfing and/or conditioning during the forging process. If nickel is substantially less than the specified minimum of 0.30%, the mold block will have reduced hardenability and deficiency of toughness during service. Nickel should be present preferably in the range of 0.20% and 0.90% and most preferably in the range of 0.30% and 0.80%.

Molybdenum is a key element contributing to hardenability and wear resistance by the fact that it is a strong carbide former. Its beneficial effects are effective in the range of 0.20% to 0.55% molybdenum but preferably it is maintained in the upper band of the range from 0.30% to 0.55% molybdenum and most preferably in the range of 0.35% to 0.55% molybdenum.

Vanadium is a key element and is specified for its high effect on hardenability, wear resistance and grain refining properties. It has been discovered that the addition of vanadium in the specified range of 0.05% to 0.20% combined with proper heat treatment can significantly improve hardenability, particularly in large sections of at least 20 inches. Testing of steel samples with statistically constant alloy constituents except for vanadium as shown in Table 1 showed that the addition of vanadium significantly increased hardenability.

TABLE 1

| ID  | C    | Si   | Mn   | Cr   | Ni   | Mo   | V    |
|-----|------|------|------|------|------|------|------|
| X0  | .035 | 0.40 | 0.85 | 1.82 | 0.48 | 0.53 | 0    |
| X10 | 0.35 | 0.43 | 0.97 | 1.87 | 0.47 | 0.54 | 0.10 |
| X15 | 0.36 | 0.43 | 1.01 | 1.85 | 0.50 | 0.53 | 0.13 |
| X20 | 0.35 | 0.41 | 1.00 | 1.85 | 0.49 | 0.51 | 0.19 |

For steel X0, one type of carbide was mostly present containing molybdenum and manganese. X20 showed the same carbides but with the addition of a second type of carbides containing vanadium. The vanadium carbide family is much more stable to aging when compared to chromium carbides. To have optimal effect on all characteristics, preferably vanadium is present in the range of 0.07% to 0.20%, and most preferably in the range of 0.10% to 0.20% with an aim of 0.15% as shown in the FIGURE. Vanadium also has a significant impact on wear resistance and machinability.

Aluminum is desirable for grain refinement but can have a detrimental effect on steel quality by causing the presence of aluminates, an undesirable impurity. It is therefore important to minimize the addition of aluminum to a maximum of 0.040% in the final melt composition. Most preferably, an aim of 0.020% aluminum will achieve grain refinement.

Phosphorus could increase machinability but the detrimental effects of this element in tool steels, such as an increase in the ductile-brittle transition temperature, outweigh any beneficial effects. Accordingly, the phosphorus content should not be more than the specified maximum of 0.025% and most preferably lower than 0.015%.

Sulfur is a key element for machinability and it is commonly believed that a content up to 0.045% in tool steel would render acceptable machinability. However, sulphur also has several detrimental effects in this type of steel including hot shortness during processing and reduced polishing and texturing characteristics. Since the effect of vanadium on carbide size has a significant impact on machinability, it is desirable to maintain sulphur to a value lower than 0.025%, preferably lower than 0.015% and most preferably lower than 0.005%.

A comparison of core vs. hardness tests in mold and die block sections of 20 inches and larger has disclosed that the hardenability of the pieces are substantially uniform across the entire cross section. This is a marked improvement over tooling sets made from currently available steels in which the hardenability of such large sections tends to fall off near the center.

A series of steps that may be involved in manufacturing plastic injection molding tooling having high hardenability in sections of 20 inches and larger is shown in FIG. 1. At a first block 102, a steel melt may be formed in a heating unit, such as an electric arc furnace. The melt may contain a majority but less than all of the requisite alloys, aluminum for example being deferred until near the end of the process. It will be understood that the heating unit used for forming the steel melt may be other types of heating units apparent to those skill in the art such as, but not limited to, a vacuum induction furnace or a laser melting device. Thus, the steel melt may be formed by various processes such as, but not limited to, electric arc melting, vacuum induction melting, laser melting, and other suitable heating methods apparent to those with ordinary skill in the art. For instance, it some embodiments, the alloy elements may be provided as a powder and melted with a laser to form the steel melt.

After the melt is formed, it is transferred to a receptacle, such as a bottom pour ladle, to thereby form a heat according to a block 104. Thereafter, the heat is heated, further alloyed and refined by mixing the heat until the alloys are uniformly dispersed and the alloy composition of the heat is brought into specification (block 106). Thereafter, the heat is subjected to vacuum degassing and then teemed into ingot molds by bottom pouring according to a block 108.

Additionally, according to a block 110, the ingots may optionally be subjected to remelting as a secondary melting process. Remelting may improve the quality of the ingots by increasing the chemical and/or mechanical homogeneity of the ingots, and by providing more control over the microstructure characteristics of the ingots. Remelting may be accomplished by vacuum arc remelting (VAR), electroslag remelting (ESR), or other suitable remelting methods apparent to those with ordinary skill in the art.

Following solidification, the ingots may be hot worked to form the resultant low alloy steel into mold and die blocks having cross sections of 20 inches and larger (block 112). Thereafter, the mold and die blocks may be heat treated by quenching, preferably in water, and tempered according to next block 114. At a next block 116, the plastic injection molding tooling may be formed from the quenched and tempered mold and die blocks.

Although a specific example of the invention has been disclosed herein, it will be obvious to those that are skilled in the art that modifications may be made within the spirit and scope of the invention. Accordingly, it is intended that the scope of the invention be limited solely by the scope of the hereafter appended claims when interpreted in light of the relevant prior art.

What is claimed is:

1. A method of manufacturing plastic injection, molding tooling in sections of 20 inches and larger, said method comprising the steps of:
   (1) forming a steel melt having less than all of the alloy ingredients in a heating unit;
   (2) transferring said melt to a receptacle to thereby form a heat;
   (3) heating, further alloying of the alloy composition into specification and refining said heat by stirring using argon purging, magnetic stirring or some other mixing method;
   (4) vacuum degassing, teeming and casting said heat to form ingots by bottom pouring;
   (5) remelting said ingots;
   (6) hot working said ingots to form mold and die blocks having cross sections of 20 inches and larger, said mold and die blocks having the following composition by weight percent

| | |
|---|---|
| C | 0.15-0.40, |
| Mn | 0.60-1.10, |
| Si | 0.60 max, |
| Cr | 1.00-2.00, |
| Ni | 0.15-1.00, |
| Mo | 0.20-0.55, |
| V | 0.05-0.20, |
| Al | 0.040 max, |
| P | 0.025 max, and |
| S | 0.025 max; |

(7) heat treating said mold and die blocks by quenching, and tempering; and
   (8) forming plastic injection molding tooling from said quenched and tempered blocks.

2. The method of manufacturing plastic injection molding tooling of claim 1, wherein remelting said ingots comprises remelting said ingots by vacuum arc remelting (VAR).

3. The method of manufacturing plastic injection molding tooling of claim 1, wherein remelting said ingots comprises remelting said ingots by electroslag remelting (ESR).

4. The method of manufacturing plastic injection molding tooling of claim 1, wherein said heating unit is an electric arc furnace.

5. The method of manufacturing plastic injection molding tooling of claim 1, wherein said heating unit is a vacuum induction furnace.

6. A method of manufacturing plastic injection molding tooling in sections of 20 inches and larger, said method comprising the steps of:
   (1) forming a steel melt having less than all of the alloy ingredients in a heating unit;
   (2) transferring said melt to a receptacle to thereby form a heat;
   (3) heating, further alloying of the alloy composition into specification and refining said heat by stirring using argon purging, magnetic stirring or some other mixing method;
   (4) vacuum degassing, teeming and casting said heat to form ingots by bottom pouring;
   (5) remelting said ingots;
   (6) hot working said ingots to form mold and die blocks having cross sections of 20 inches and larger, said mold and die blocks comprising 0.05 to 0.20 percent by weight vanadium;
   (7) heat treating said mold and die blocks by quenching, and tempering; and
   (8) forming plastic injection molding tooling from said quenched and tempered blocks.

7. The method of claim 6, wherein remelting said ingots comprises remelting said ingots by one of vacuum arc remelting (VAR) and electroslag remelting (ESR).

8. The method of claim 7, wherein said mold and die blocks further comprise the following elements in percent by weight:

| | |
|---|---|
| C | 0.15-0.40, |
| Mn | 0.60-1.10, |
| Si | 0.60 max, |
| Cr | 1.00-2.00, |
| Ni | 0.15-1.00, |
| Mo | 0.20-0.55, |
| V | 0.05-0.20, |
| Al | 0.040 max, |
| P | 0.025 max, and |
| S | 0.025 max. |

9. The method of claim 7, wherein said mold and die blocks have the following composition in percent by weight:

| | |
|---|---|
| C | 0.20-0.35, |
| Mn | 0.70-1.10, |
| Si | 0.15-0.50, |
| Cr | 1.10-2.00, |
| Ni | 0.20-0.90, |
| Mo | 0.30-0.55, |
| V | 0.07-0.20, |
| Al | 0.040 max, |
| P | 0.020 max, and |
| S | 0.015 max. |

10. The method of claim 7, wherein said mold and die blocks have the following composition in percent by weight:

| | |
|---|---|
| C | 0.25-0.33, |
| Mn | 0.80-1.10, |
| Si | 0.20-0.45, |
| Cr | 1.20-2.00, |
| Ni | 0.30-0.80, |
| Mo | 0.35-0.55, |
| V | 0.10-0.20, |

-continued

| | |
|---|---|
| Al | 0.020 max, |
| P | 0.015 max, and |
| S | 0.005 max. |

11. The method of claim 7, wherein said heating unit is an electric arc furnace.

* * * * *